US008655502B2

(12) United States Patent
Santos

(10) Patent No.: US 8,655,502 B2
(45) Date of Patent: Feb. 18, 2014

(54) ROTATABLE FAN ARRAY ROTATED BASED ON COMPUTER PROCESS EXECUTION FOR PERSONAL COMPUTER

(75) Inventor: Wallace Santos, Union, NJ (US)

(73) Assignee: EZ-Tech Corp, Kenilworth, NJ (US)

( * ) Notice: Subject to any disclaimer, the term of this patent is extended or adjusted under 35 U.S.C. 154(b) by 251 days.

(21) Appl. No.: 13/105,159

(22) Filed: May 11, 2011

(65) Prior Publication Data

US 2012/0287571 A1 Nov. 15, 2012

(51) Int. Cl.
*G05D 23/00* (2006.01)
(52) U.S. Cl.
USPC .......................................... 700/300; 700/278
(58) Field of Classification Search
None
See application file for complete search history.

(56) References Cited

U.S. PATENT DOCUMENTS

| 6,835,070 | B1 | 12/2004 | Law |
| 6,900,984 | B2 * | 5/2005 | Merz et al. ............... 361/679.55 |
| 7,170,745 | B2 * | 1/2007 | Bash et al. .................... 361/695 |
| 7,352,575 | B2 * | 4/2008 | Anderl et al. ................. 361/695 |
| 7,424,806 | B2 * | 9/2008 | Tien et al. ....................... 62/178 |
| 2009/0230307 | A1 | 9/2009 | Han et al. |
| 2011/0029153 | A1 * | 2/2011 | Shah et al. .................... 700/300 |
| 2011/0320062 | A1 * | 12/2011 | Tan .............................. 700/300 |
| 2012/0065809 | A1 * | 3/2012 | Allard et al. .................. 700/300 |

* cited by examiner

*Primary Examiner* — Sean P. Shechtman
(74) *Attorney, Agent, or Firm* — Michael J. Feigin, Esq.; Feigin & Associates, LLC

(57) ABSTRACT

Embodiments of the disclosed technology comprise a computer with at least one fan which may change orientation based on anticipated or actual heat of a device within the computer. The fan, in an embodiment of the disclosed technology, may point towards a central processing unit, a graphics card, or any other device generating heat, and, based on various thresholds, the fan may change direction to remove hot air from a more urgently needed device or section of the interior of a computer.

10 Claims, 10 Drawing Sheets

| Trigger (902) | Point (904) | Priority (906) |
|---|---|---|
| GPU Usage Above Threshold? 910 | GPU | 6 |
| 3D Graphics Rendering Engaged? 920 | GPU | 4 |
| Graphics Card Temp. Above Threshold? 930 | GPU | 8 |
| CPU Usage Above Threshold? 940 | CPU | 9 |
| CPU Speed Maximized? 950 | CPU | 5 |
| CPU Temperature Above Threshold? 960 | CPU | 7 |
| Hard Disk Temperature Above Threshold? 970 | Up | 3 |
| Alternate Thermostat Above Threshold? 980 | Down | 2 |
| Power Supply Temp Above Threshold? 990 | Down | 1 |

Figure 9

ROTATABLE FAN ARRAY ROTATED BASED ON COMPUTER PROCESS EXECUTION FOR PERSONAL COMPUTER

FIELD OF THE DISCLOSED TECHNOLOGY

The disclosed technology relates generally to cooling in computer systems, and more particularly, to air flow of such systems.

BACKGROUND OF THE DISCLOSED TECHNOLOGY

Overheating is a well-known problem in the art of electronics. Peripherals, microchips, and data storage devices, as well as almost all mechanical, electrical, or biological items, have optimal, preferable, and required temperature ranges in which they function. As the ambient temperature changes, which is usually a rise in heat when such objects are in operation, efficiency decreases, or even the ability to operate at all.

In electronic cabinets, such as computer cases, the use of fans, liquid cooling, designs taking advantage of convection currents, and/or heat sinks to move heat away from hot spots and out of the case, is known in the art. So, for example, in a typical personal computer, a fan, heat sink, or both is/are placed over the central processing unit (CPU) because this device is a major source of heat. Similarly, fans are typically placed in power supplies and vent towards the outside of a case for the same reason.

However, heat generation and dissipation are still problems in modern day computers. Needed are more efficient mechanisms for either decreasing the heat generated, or more efficiently removing the heat from devices generating same, and/or the computer case itself.

SUMMARY OF THE DISCLOSED TECHNOLOGY

An object of the disclosed technology is to direct a fan towards an area of greatest need within an electronic cabinet, such as a computer case.

Another object is to keep a computer running at maximal performance.

In an embodiment of the disclosed technology, a computer case has a graphics processing device (such as a video card, graphics processing unit (GPU), and other devices known in the art for processing instructions and providing video output) and a CPU (central processing unit). A fan rotatable between a first and second orientation, the first orientation causing the fan to point towards the graphics processing device, and the second orientation causing the fan to point towards the CPU, is claimed. In embodiments, a choice is made between the two orientations based on usage of the GPU or the CPU, such as above a predefined threshold of utilization over a period of time or at a single measured moment of time. In other embodiments, the choice is made based on the temperature of the graphics processing device or the central processing unit above a predefined threshold.

In embodiments of the disclosed technology, there are at least two fans. One fan blows air towards the graphics processing device or central processing unit, while another sucks air away from the device or unit. Both fans are rotatable. In another embodiment, there are three fans. One fan directs air towards the top of the graphics processing device, one fan directs air towards the bottom of the graphics processing device, and one fan sucks air from the graphics processing device.

In a method of directing air flow in a computer case based on heat generation, an embodiment of the disclosed technology proceeds as follows. First, it is determined when a heat-related attribute of a first device within the computer rises above a pre-defined starting threshold. Then, at least one fan is rotated towards the first device such that airflow is directed more towards the first device than previously. If a heat-related attribute of a second device within the computer rises above a pre-defined starting threshold, then the fan may be rotated towards the second device, if the heat-related attribute of the new/second device takes priority over the attribute of the first device. Finally, at least one fan is returned to its original position upon all heat-related attributes being below a finishing threshold.

The finishing threshold(s) may be lower than, or the same as, the pre-defined starting threshold(s). That is, where the heat-related attribute is temperature, the starting threshold may be a first temperature, whereas the finishing threshold, where the fan moves to another orientation (e.g., starting, resting, or towards another device) is at a lower second temperature only.

In some embodiments, the CPU heat-related attributes always take precedence over heat-related attributes of other devices. In others, the fan is rotated towards the second device only after the heat-related attribute of the first device falls below the finishing threshold of said first device. Two fans may be used, and at least one fan sucks air away from the pointed-to device.

A heat-related attribute is usage of a said device known to generate above-average amounts of heat, such as usage of a three-dimensional graphics rendering engine, a floating point unit, a graphics processing unit, or other device which otherwise sits idle at times. "Usage" may be defined as any usage at all, usage over a certain period of time, and/or usage above a pre-defined minimum utilization of a processor. Another heat-related attribute is the temperature of a device.

A system for changing the direction of airflow within an electronic cabinet is also disclosed. The system has a directional fan mounted in the electronic cabinet, means for detecting usage of a heat-generating device within the electronic cabinet, means for rotating the directional fan towards the heat-generating device, and means for prioritizing direction of the fan based on anticipated and actual heat generated. The means for determining actual heat generated and/or usage of a heat-generating device may be a thermometer. Means for determining anticipated heat generated may include engagement of usage of a processor (starting to use such a processor or sub-processor or usage above a pre-defined threshold of utilization for a pre-defined period of time) on a heat-generating device, such as a processor on a video card or motherboard. A plurality of directional fans may be rotated, each in a different direction, upon detection of usage of a heat generating device.

Further details are set forth in the detailed description below.

BRIEF DESCRIPTION OF THE DRAWINGS

FIG. 9 shows a preference order for directing air flow in embodiments of the disclosed technology.

DETAILED DESCRIPTION OF EMBODIMENTS OF THE DISCLOSED TECHNOLOGY

Embodiments of the disclosed technology comprise an electronic cabinet or personal computer case (herein defined as a subset of the category of electronic cabinets designed for a personal computer, housing a CPU, one or more disk drives, volatile memory, power supply, and motherboard, or equivalents thereof) with at least one rotatable fan. As it is obvious in the art that fan blades spin about a central axis, here, the term "rotatable fan," as used in this disclosure, refers to a secondary meaning of "rotate." Here, "rotatable fan" is defined as the ability to change the orientation of the direction of airflow created by the spinning fan blades, generally by altering the orientation of a fan assembly, including a spindle to which the fan blades are attached. Further, for purposes of the disclosure, "fan" is defined as any directionally orientable device with the ability to directly affect air flow.

In this manner, the rotatable fan is positioned, in embodiments of the disclosed technology, to cause the greatest velocity of air currents in a desired direction, or in combination with a plurality of fans, to control the direction of airflow throughout the cabinet or case. The fans may act synchronously (move together) or asynchronously (face in directions such that airflow from each fan opposes every other). Thus, the fans may, for example, be pointed upwards or downwards to cause air to flow in the respective direction. Or, in an asynchronous manner, one fan may direct air downwards and another upwards, such as at 45 degree angles, so that the airflow is generally horizontal at a mid-region between two fans.

Still further, in embodiments of the disclosed technology, the method of determining when a fan points in a certain direction is based on data from thermometers or other temperature measuring devices placed at various locations within the case. Thermometers may also be integrated into peripherals, such as video cards, hard disks, and CPUs or motherboards.

Still further, in embodiments of the disclosed technology, the method of determining when a fan points in a certain direction is software controlled and/or based on interrupt signals or data being transferred via the bus system of the computer. That is, if for example, a spreadsheet calculation is underway and the process is CPU-use heavy, the fans point towards the CPU. On the other hand, if a video game is being played which requires complex rendering, based on such an application being run and/or a measured number of interrupts above a pre-defined threshold and/or while interrupts or CPU usage (or other such indicators) are below a certain threshold, the fans point towards the graphics card to dissipate heat from this peripheral.

Embodiments of the disclosed technology will become clearer in view of the following description of the Figures.

Figure 1:
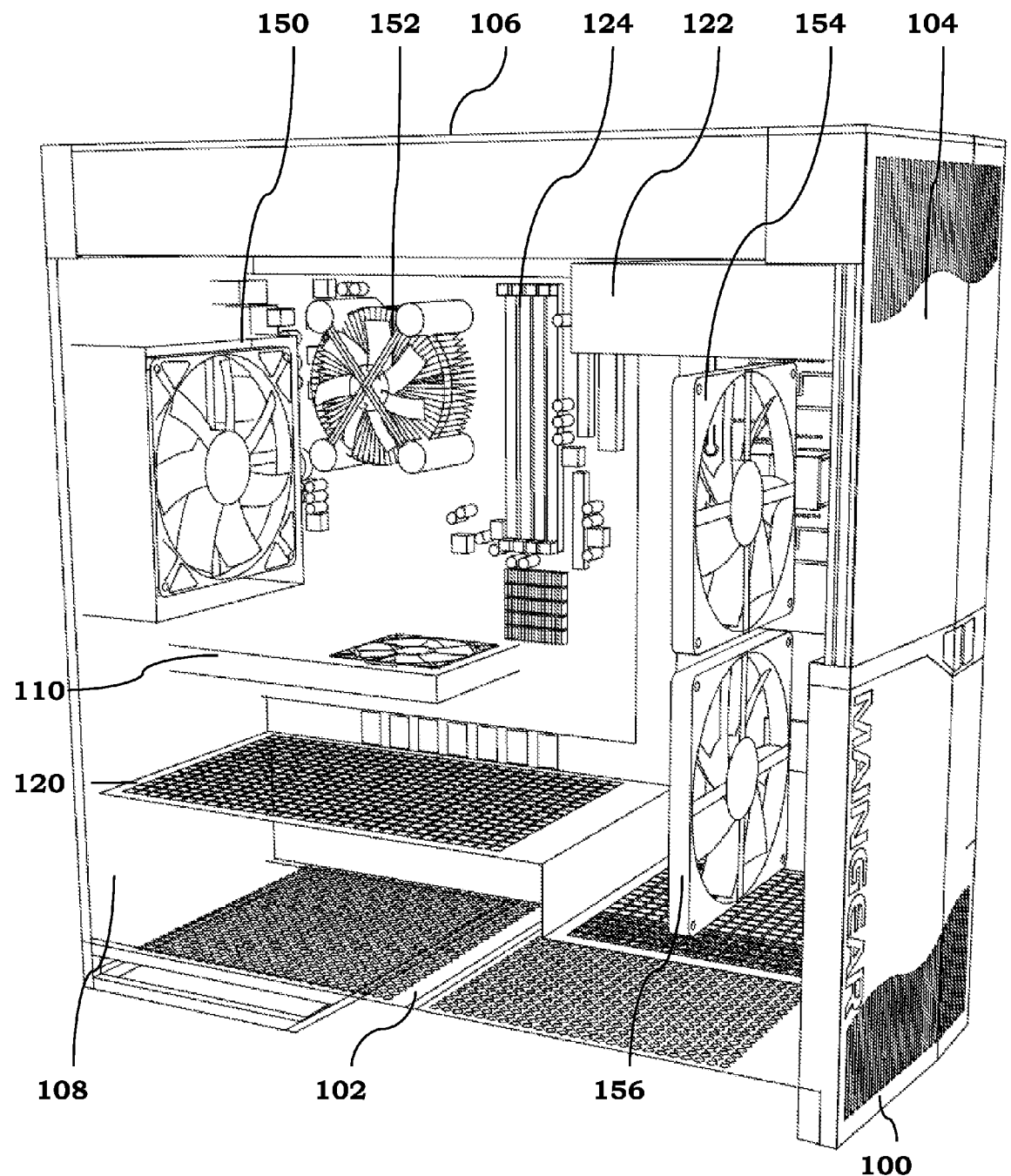
FIG. 1 shows an elevation view of an open computer case comprising a plurality of fans placed at a multiple of 90 degrees to each other in an embodiment of the disclosed technology.
Figure 7:
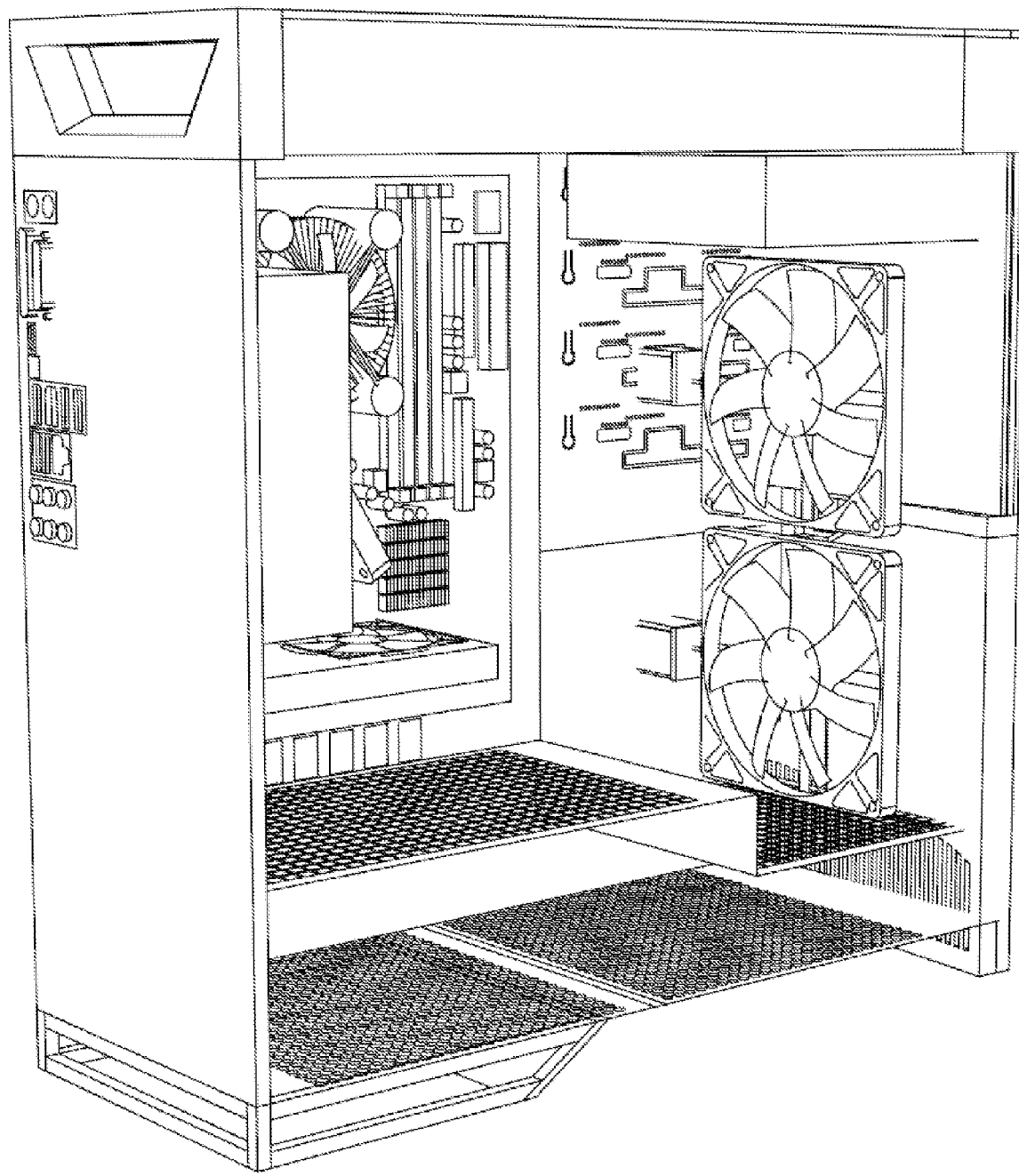
FIG. 7 shows a reverse perspective view of the computer case of FIG. 1 with a single fan orienting airflow upwards.

FIG. 1 shows an elevation view of an open computer case comprising a plurality of fans at a multiple of 90 degrees to each other in an embodiment of the disclosed technology. FIG. 7 shows a reverse perspective view of the computer case of FIG. 1, with a single fan orienting airflow upwards. Any computer case or electronic cabinet known in the art may be retrofitted or designed to carry out embodiments of the disclosed technology, and the technology is not limited to the exemplary case shown in the figures. Computer case 100 comprises a bottom panel 102, front panel 104, top panel 106, and back panel 108. Two side panels, for a total of six sides, are found on most cases, such as those used in embodiments of the disclosed technology. Typical computers also include such items as one or more CPUs (under fan 152), slots for volatile memory/random access memory 124, drive bays 122 for housing CD-ROM (compact disc read only memory), DVD (digital versatile disk), and other disk drives. Various microchips are on the mother board, though they have not been labeled for clarity of the drawings, the motherboard being a generally flat rectangular board, in this figure extending vertically behind the fans and other identified items within the computer case 100. Motherboards are, of course, generally known in the art. In the particular case shown in FIG. 1, a divider 120 separates a top inner portion from a lower inner portion where a power supply is housed.

In embodiments of the disclosed technology, any number of rotatable fans may be utilized. For example, in FIG. 1, a CPU fan 152 is placed over the CPU, a rear exhaust fan 150 pushing air out of the rear panel 108 of the case 100, fan on the peripheral 110, and two standing fans 154. Fans 150, 154, and 156 are rotatable in this embodiment and are shown in FIG. 1 with the long axes thereof pointing horizontally to (perpendicular to) the invisible flat surface on which the computer case 100 rests. In this configuration, fans 154 and 156 blow air normal to the back panel 108 of the case, and fan 150 blows air through the back panel 108 at a right angle to the panel (directly through).

Figure 2:
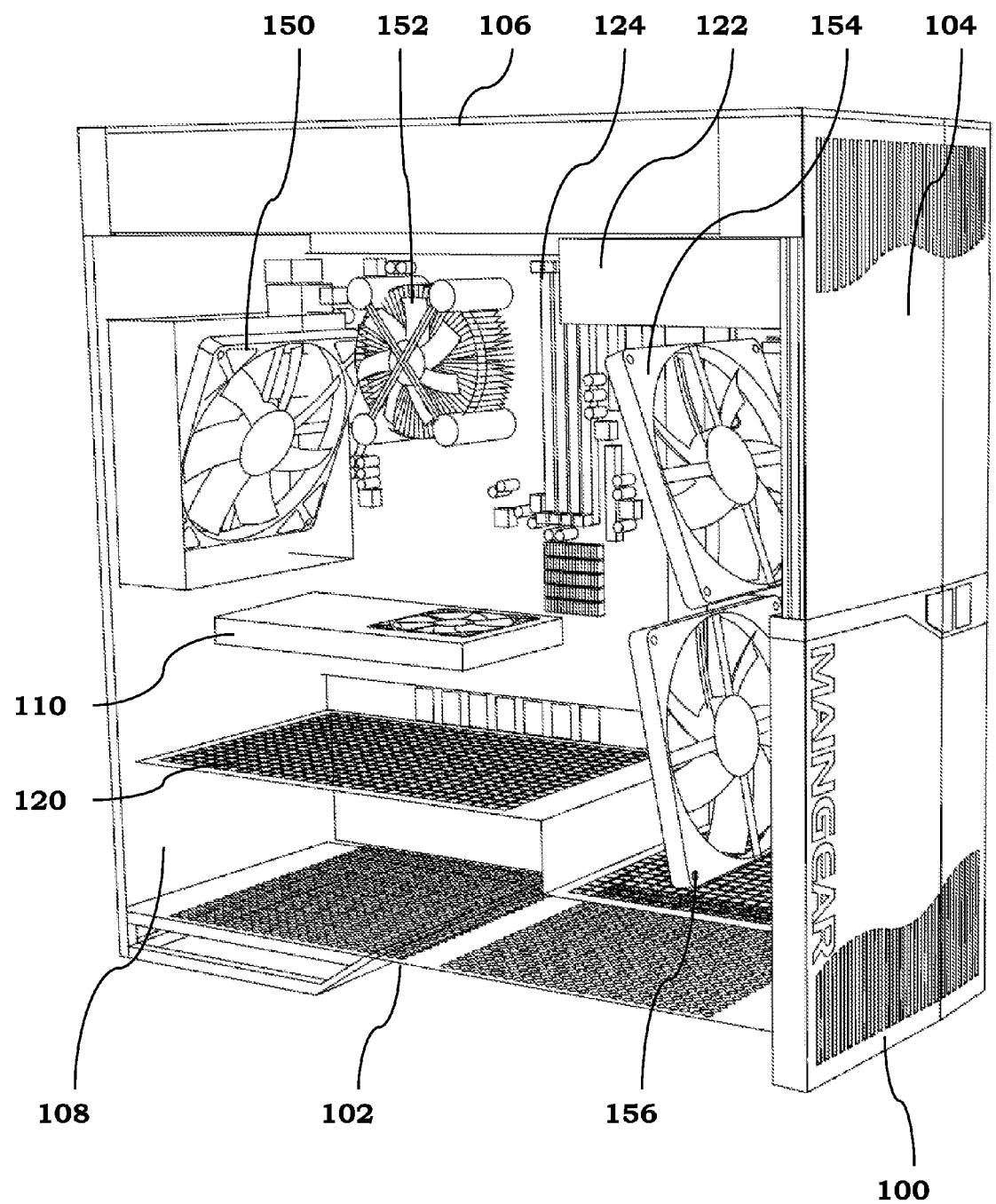
FIG. 2 shows the computer case of FIG. 1 with rotatable fans of the plurality of fans directing air flow downwards.

FIG. 2 shows the computer case of FIG. 1 with rotatable fans of the plurality of fans directing air flow downwards. In this figure, fans 154 and 156 primarily direct air past the peripheral 110 (as described above, an add-on card such as a video card) to remove hot air there from. Fan 150 conversely pulls air away from the peripheral 110 and pushes it in a slightly upward direction out of the back panel 108 of the case 100. In this manner, when the peripheral 110, such as a graphics card, is generating the most, or a higher than resting or light usage, amount of heat, the heat is removed most efficiently from this device, so that it may continue to operate at a high rate of processing, or higher than otherwise obtainable for a longer period of time, as heat is removed from this area of the inside of the case more readily than other areas during this time.

Figure 3:
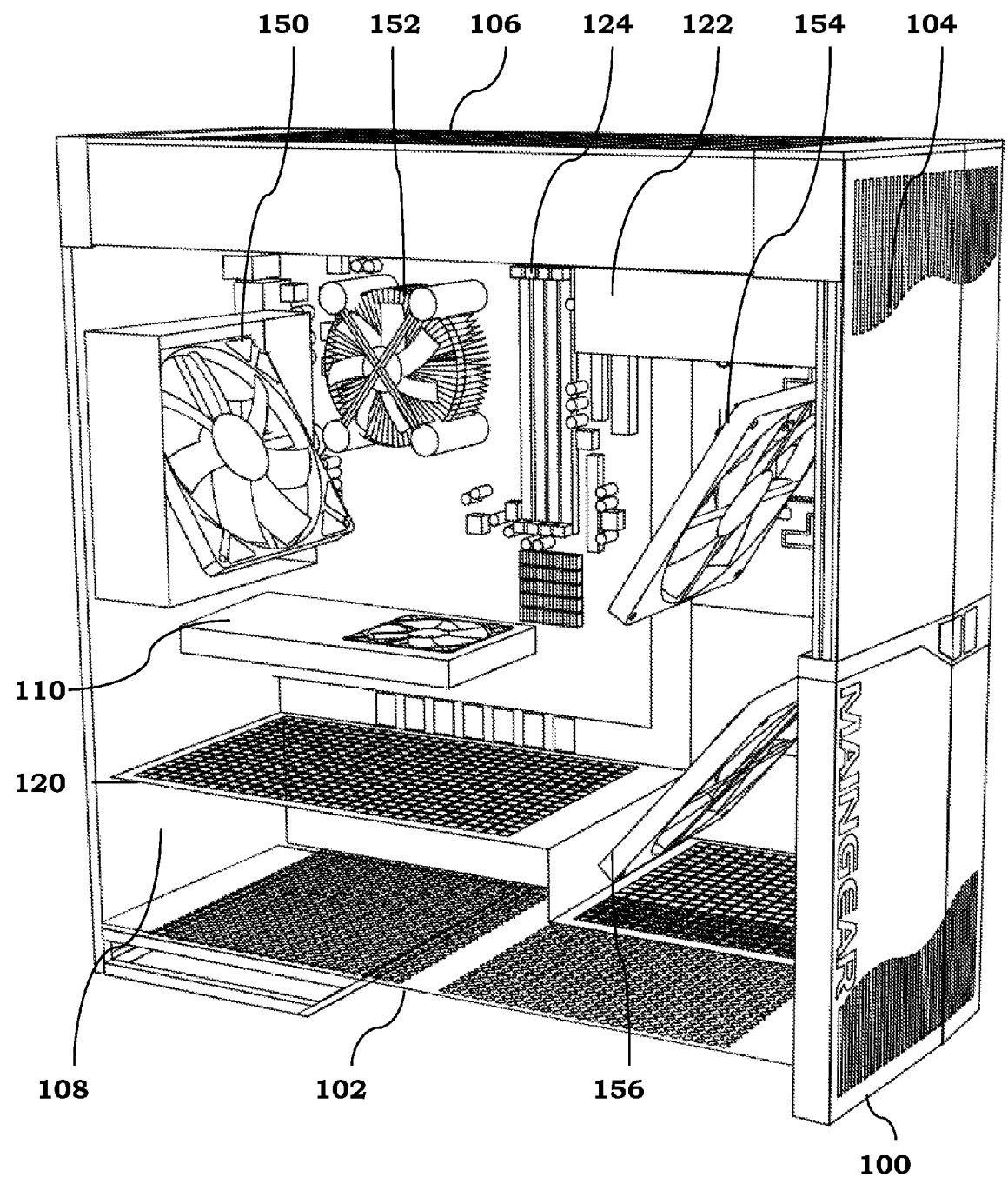
FIG. 3 shows the computer case of FIG. 1 with rotatable fans of the plurality of fans directing air flow upwards.
Figure 6:
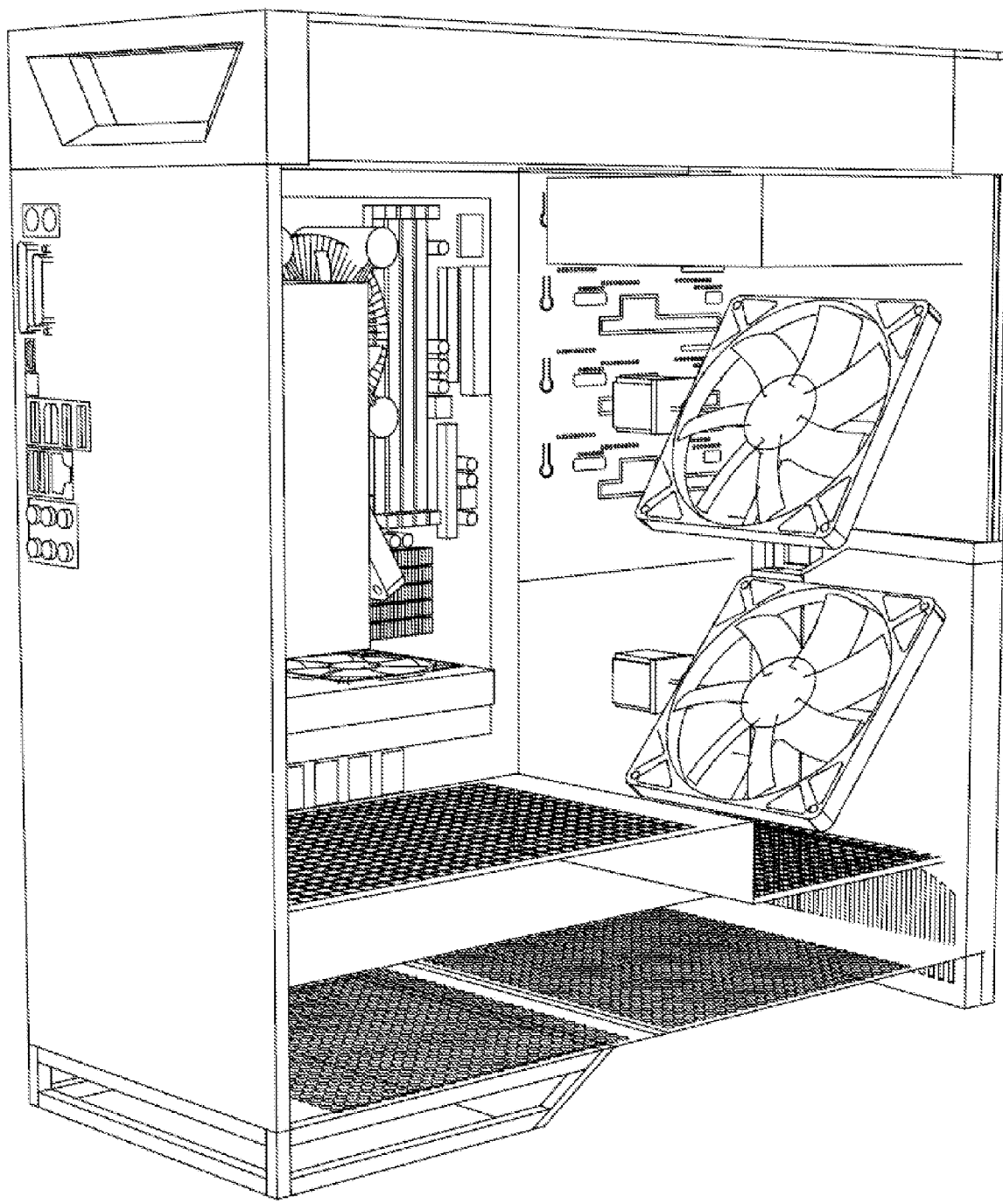
FIG. 6 shows a reverse perspective view of the computer case of FIG. 3.

FIG. 3 shows the computer case of FIG. 1 with rotatable fans of the plurality of fans directing air flow upwards. FIG. 6 shows a reverse perspective view of the computer case of FIG. 3. Fans 154 and 156 direct airflow upwards towards the CPU (situated behind fan 152) in this embodiment. Conversely, fan 150 sucks air from the CPU and pulls it downwards, out of the back panel 108 of the case 100. In this manner, when CPU usage is most intense/the CPU is creating a much greater than average amount of heat, such heat may be efficiently removed. The greatest airflow is near the top of the case 106, allowing cooler air near the divider 120 and bottom of the case 102 to remain more stagnant.

Figure 4:
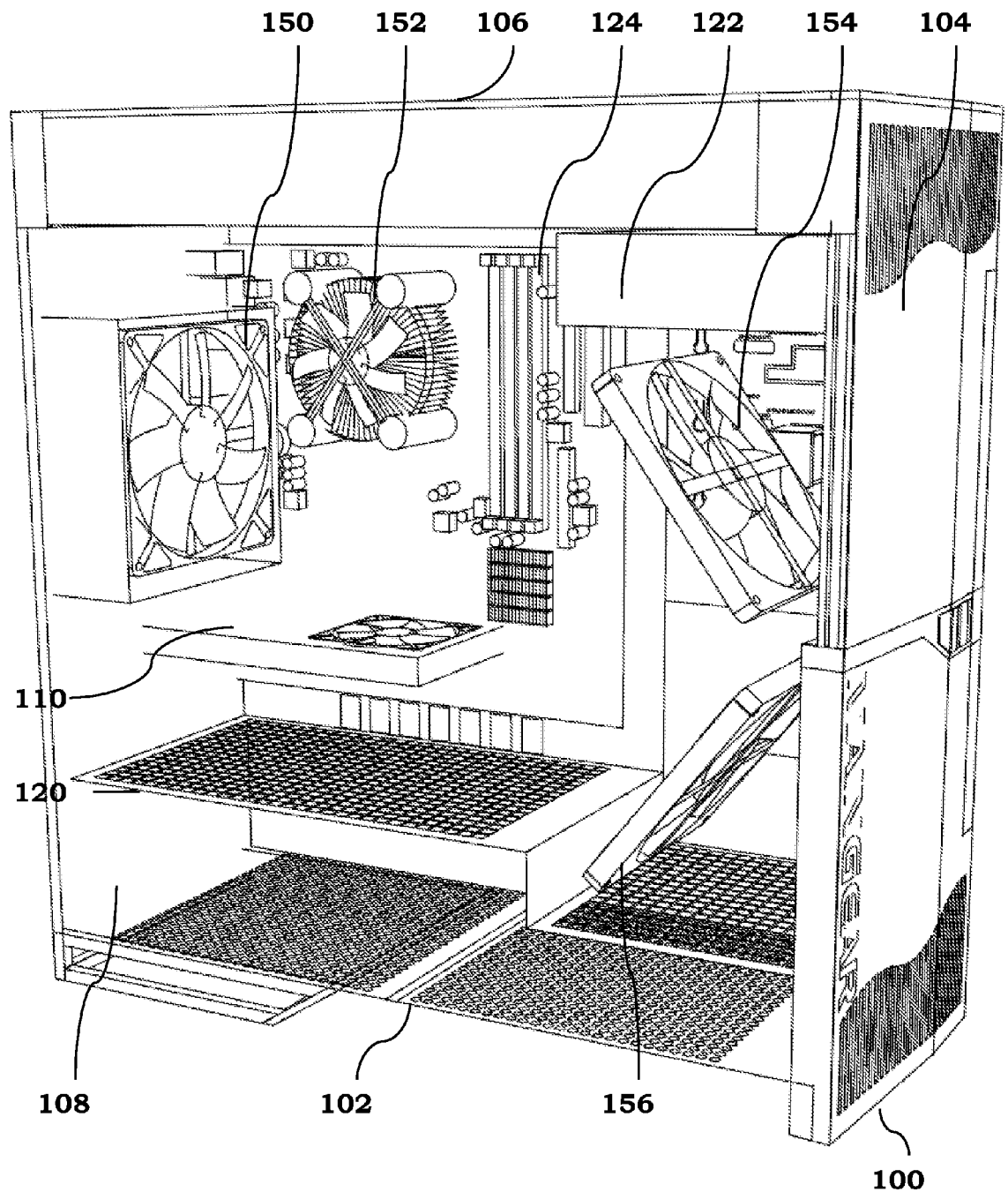
FIG. 4 shows the computer case of FIG. 1 with rotatable fans of the plurality of fans pointed towards a peripheral card.

FIG. 4 shows the computer case of FIG. 1 with rotatable fans of the plurality of fans pointed towards a peripheral card. In this configuration, such as when the peripheral card 110 is a graphics card and a graphic-intensive process, such as 3D rendering, full screen video, or the like, then fans 154 and 156 point towards the peripheral card which generates heat while conducting such processor-intensive operations. In areas outside of the direct path of the airflow of the fans 154, 156, and 150, the air flow is more stagnant. Since such air outside of the areas of airflow is generally cooler, this allows the cooler air to remain in the case 100, while moving the hottest air out of the case.

Figure 5:
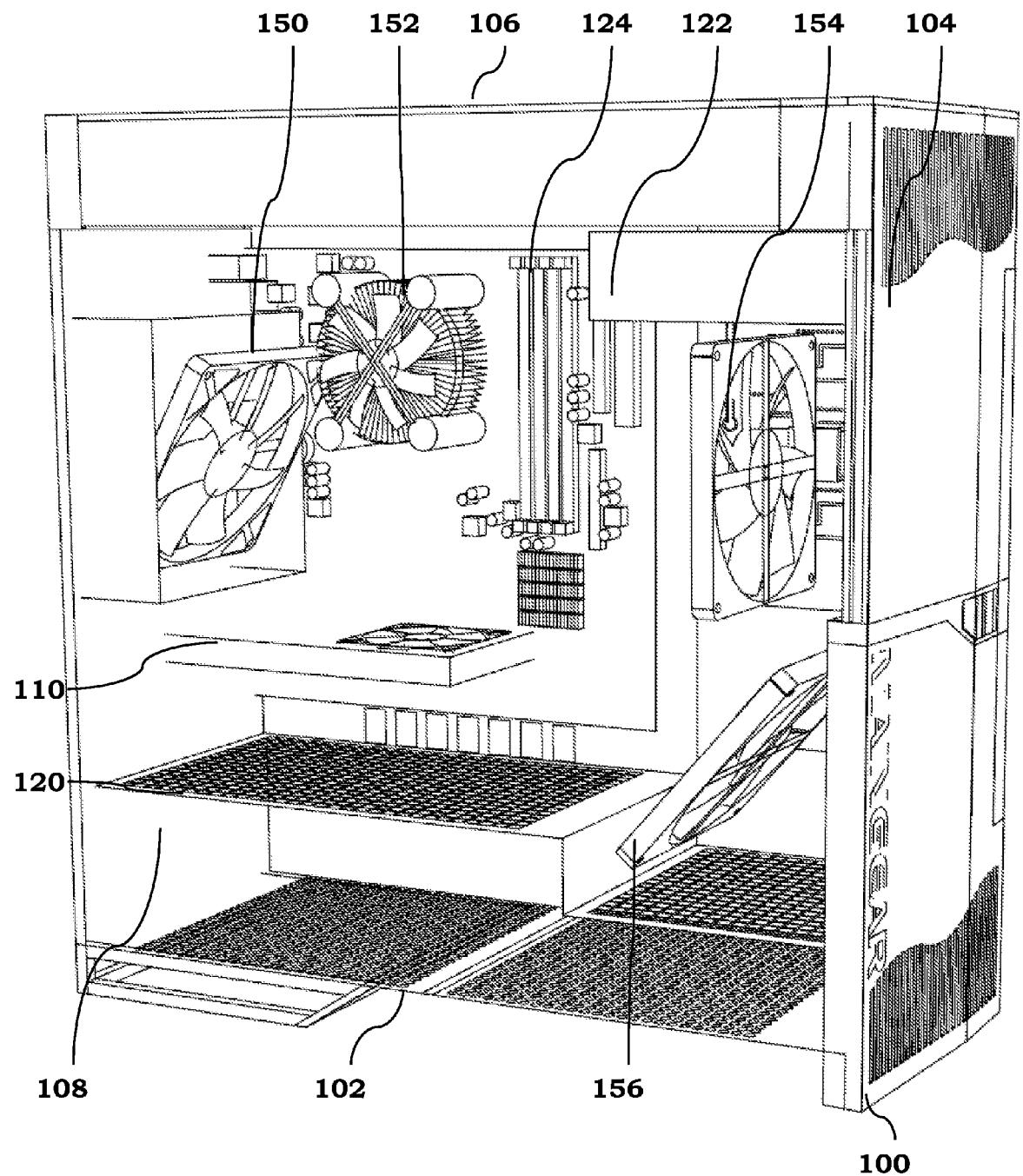
FIG. 5 shows the computer case of FIG. 1 with rotatable fans of the plurality of fans pointed towards a central processing unit (CPU).

FIG. 5 shows the computer case of FIG. 1 with rotatable fans of the plurality of fans pointed towards a central processing unit (CPU). In this configuration, the central processing unit under fan 152 generates the most heat because it conducts the largest number of computational operations. As such, fan 156 points upwards towards the CPU, 154 points directly across, and fan 150 is aligned with 156 to create a strong cross current between fans 156 and 150 to pull hot air blown into the current by fan 152 out the rear 108 of the case 100. Fan 154 also aids in pushing the hot air towards and then out through the rear fan 150.

Figure 8:
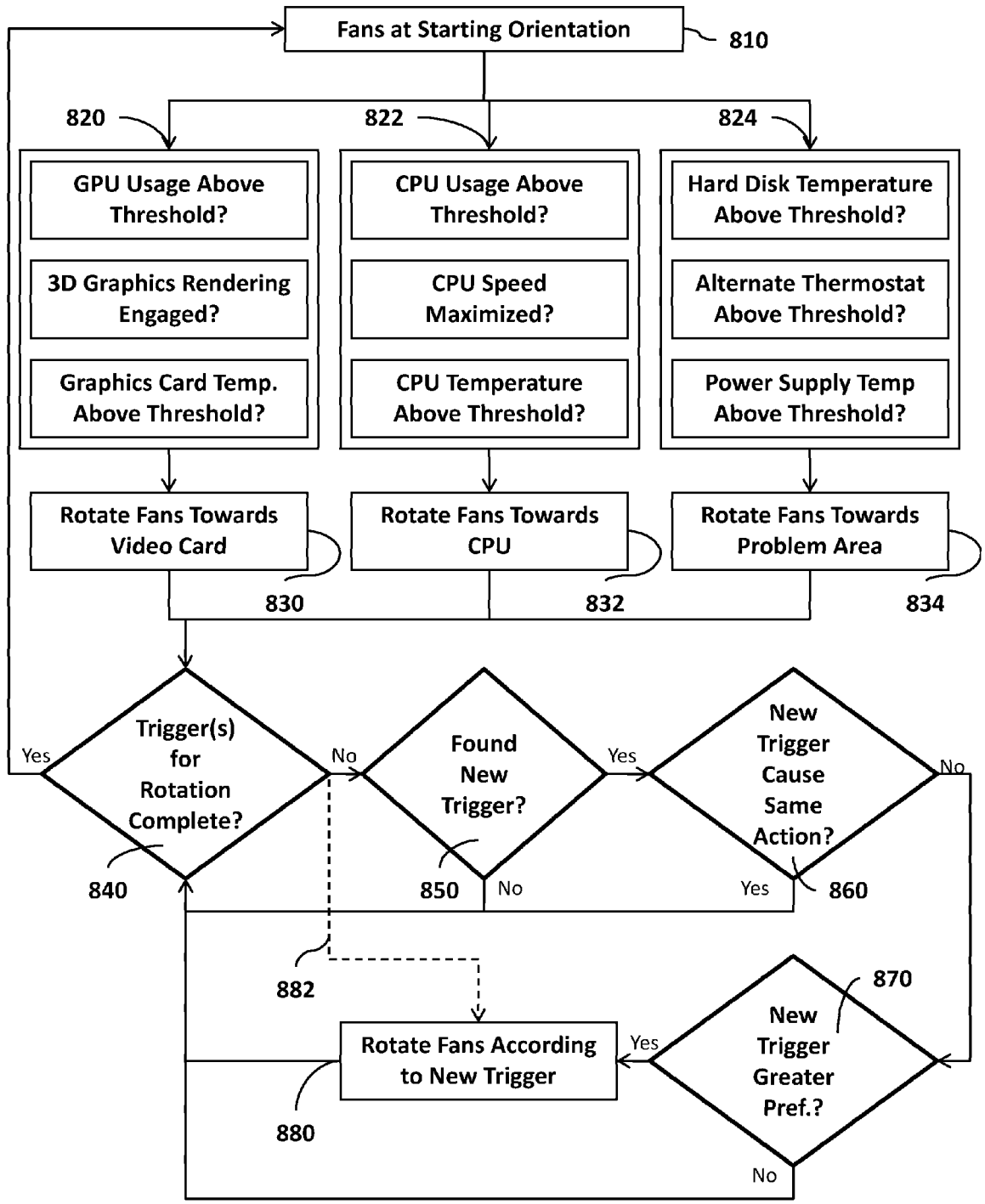
FIG. 8 shows a flow chart of steps taken in determining how to rotate fans used in embodiments of the disclosed technology.

FIG. 8 shows a flow chart of steps taken in determining how to rotate fans used in embodiments of the disclosed technology. In step 810, the fans are positioned at a starting orientation, such as shown in FIG. 1. For power conservation or noise reduction, one, a plurality of, or all of the fans may be turned off or have a reduced speed when not needed, such as when the temperature or usage of the computer hardware is at a minimum. For example, referring to FIG. 1, in a starting orientation of step 810, fans 154 and 156 may be powered down. In the steps numbered in the 820s referring to determination of either usage of a hardware device or temperature being above a threshold, or some combination thereof, it is determined which area of the computer has the most heat or is likely to generate the most heat.

More specifically, 820 refers to steps taken concerning determinations made with regard to a graphics card (e.g., an add-on card 110 of FIG. 1). If GPU (graphics processing unit) usage is above a predefined threshold, if a three-dimensional graphics rendering is engaged, or the temperature of the graphics card (as measured by a thermometer touching a part thereof and/or integrated with the graphics card and/or reported by the graphics card to software capable of interpreting and processing such information), then in step 830, the fans, such as fans 150, 154, and 156, are rotated towards the graphics card. This is shown in FIG. 2.

Alternatively, 822 refers to steps taken concerning determinations made with regard to a CPU. If the CPU usage is above a threshold, the CPU speed is maximized, or the CPU temperature is above a threshold, as determined in step 822, then step 832 is carried, out whereby fans are rotated towards the CPU. This may include any one of a plurality of fans 150, 152, and 156 as shown in FIG. 3, by way of example.

Other determinations may be made which affect the direction of the fan, such as shown in box 824. These include, but are not limited to, hard disk temperature, power supply temperature, and/or an alternate thermostat, such as one placed at some point within the case. Referring to FIG. 1, such an alternate thermostat might be placed anywhere along the top side 106, bottom side 102, front panel 104, back panel 108, on a divider 120, or on/at a fan 150, 152, 154, or 156. Based on such a factor as shown in box 824 or described herein, in step 834, fans are rotated towards the problem area with an above-average temperature, above-average usage, specific usage known to cause above-average heat, or a combination thereof, when compared to an idle computer.

In step 840, it is determined whether the trigger for the fan rotation is complete. If it is, such as when the 3D graphics rendering engine is no longer engaged, the temperature of the pointed-to item drops below the threshold (or another designed threshold), or the like, then the fans are returned to their starting orientation. Different thresholds may be determined to cause one, or more than one, fan, to point towards a device within the computer, effect fan speed, and so forth. This will be explained further with reference to FIG. 9. If the trigger has not yet completed its task, that is, for example, the temperature of the pointed-to item is still above a threshold (the original starting threshold, or in embodiments of the disclosed technology, a lower temperature or lower usage ending threshold), then step 850 is carried out. That is, the fan orientation remains where it is, at the rotated position. Then, in step 850, it is determined whether there is a new trigger, such as any of those shown or described with respect to 820, 822, or 824. If there is no new trigger, then the method loops back to step 840. Until either the trigger(s) is/are no longer applicable or there is another trigger, steps 840 and 850 continuously loop.

Once a new trigger is detected in step 850, then, in step 860, it is determined whether this new trigger would cause the same action as the current trigger. If it would, then the method returns to step 840, whereby steps 840 and 850 are looped. Until both triggers are complete, the fans will not return to their starting orientation. For example, if CPU usage is at 99% for 15 seconds, in an embodiment of the disclosed technology, this would trigger a CPU usage threshold causing the fans, such as fans 150, 154, and 156 to point towards the CPU. The CPU temperature then may rise above 80° C., another trigger. Since both triggers would have the same result (fans pointing towards the CPU to blow or suck air thereto/therefrom), no change in the fan direction is made. However, the CPU usage may then drop to 10% for 15 seconds, ending the first trigger, while the temperature still remains above a CPU temperature threshold. Therefore, in this example, the second trigger still remains in force. Since not all the triggers for the rotation are complete in step 840, then the fans remain in their rotated state. Once both triggers, in this case CPU triggers, are complete or no longer valid/in force, then step 810 is carried out and the fans return to their starting orientation in step 810. In an embodiment of the disclosed technology, the fans have a new starting orientation based on the last trigger and simply turn off, reduce speed, or remain as is until a new event causes a trigger. It should also be understood that the method described is applicable for any number of triggers causing the same result.

However, referring to step 860 of FIG. 8, if there is a currently salient/active trigger, and a new trigger arises which is contradictory to the first, then the situation becomes more complicated. That is, a first active trigger may be related to the heat of the CPU, whereas a new trigger may indicate that heat of the GPU is now a concern. So, in step 870, it is determined, based on the preferences described with reference to FIG. 9 below, whether or not to obey the first trigger or the second. It should be understood that this must be determined for any number of active triggers. In any case, if the new trigger (or a new combination of triggers) has priority over the triggers causing the fans to be pointed in a certain direction, then step 880 is carried out, whereby the fans are rotated according to the new trigger (or new combination of triggers which cause the higher priority). Otherwise, the method simply returns to the steps 840 to 850 loop while waiting for the triggers to complete/new triggers are detected. If the priority trigger (or combination of triggers) completes, but a lesser priority trigger remains in effect, then step 880 is carried out, and the fans are rotated in accordance with the new trigger. (In this sense, "new" refers to newly or freshly pointing the fans as a result of a trigger, whether the trigger was first in time or not.)

In an example of the above, where step 882 is carried out, it might occur in the following scenario. The fan is at a starting orientation 810, a CPU trigger 822 causes a fan or fans to point towards the CPU, and then a GPU trigger 820 is found in step 850. This new trigger causes a different action, but the CPU trigger, in this example, has preference/priority over the GPU trigger, and so, after such a determination is made in step 870, the 840/850 loop is repeated. However, in step 840, the CPU trigger 822 eventually expires (e.g., the CPU temperature drops below a threshold), but the GPU trigger 820 remains. Thus, when step 882 is carried out, the fan is rotated according to the new trigger 820. In another example, supposing the GPU trigger 820 was first, the CPU trigger was second and takes priority causing, in step 880, the fans to rotate towards the CPU. If the CPU trigger expires (e.g., the CPU temperature drops below a threshold) then this trigger completes, but the GPU trigger continues and the fans are rotated as if the GPU trigger were a new trigger. That is, the fans rotate towards the GPU. Once the GPU trigger no longer exists, then step 810 is carried, out whereby the fans return to a starting orientation, or a new starting orientation is defined based on the orientation at the expiration of each trigger.

FIG. 9 shows a preference order for directing air flow in embodiments of the disclosed technology. The trigger 902 is the activity which occurs, or is measured, within a computer case that is used, in embodiments of the disclosed technology, to point fans, such as fans 150, 154, and/or 156, towards a particular area within the computer. The triggers 910 through 990 are the same as those listed in FIG. 8, for simplicity. The point 904 refers to the direction or orientation of one or a plurality of fans, as a result of the triggers 910 through 990 which are breached. The priority 906 refers to a priority level of the particular trigger with, in this example, a higher priority number being of greater priority. Thus, if the first trigger is the power supply temperature above a threshold 990, then the fan points down. If this trigger is still applicable while a new trigger, hard disk temperature above a threshold 970, occurs, then, since trigger 970 has a higher priority, the fan or fans now point up. While both of these triggers remain active, the CPU speed may become maximized 950 (e.g., above 90% for at least 5, 10, 15, or 30 seconds), causing a fan or fans to point at the CPU. If the graphics card temperature is then above a threshold 910, it has a higher priority (in this case, "8") and the fan or fans point accordingly. If the CPU temperature then increases above a threshold 960, the combined weight of the thresholds 950 and 960, in embodiments of the disclosed technology show that it is more important to point the fans towards the CPU rather than the GPU, as the priority numbers add up to a greater number or the number of thresholds breached is higher, etc. If there is a tie, then depending on the embodiment of the disclosed technology, the fan or fans will remain in their current orientation until the tie is broken (a trigger drops off or a new one is detected), or priority might always be given to a certain direction to point to, such as towards the CPU in a computer with greater heat problems from the CPU. Priority may instead be given based on an absolute temperature or number of degrees above the threshold. That is, in the former example, the hottest location in the computer case is where the greatest airflow and, thereby, direction of the fans, is needed. In the latter example, the CPU threshold may have been breached by 20 degrees, whereas the GPU temperature by 30 degrees, even though the actual temperature of the GPU is lower than the CPU. In such a case, priority, in this embodiment, is given to the GPU and the fans directed thereto.

Thresholds/usage may be determined with the aid of software. That is, program instructions carried out through the use of a processor. Interrupt signals between an operating system and CPU or graphics card may be used to determine when a fan should face towards one these items. Similarily, the engagement of usage of a part of one these devices (e.g. floating point unit or a specific microchip or operation used only in high intensity applications) may determine when a fan should be pointed a specific direction. Software monitoring of temperature controls provided through the computer's BIOS (basic input output system) or other monitoring software may also be utilized, and determinations of when certain applications are executed (e.g. execution of a game that uses 3D rendering or execution of a spreadsheet program) may be used to determine when a threshold or usage level has or will be obtained. The fans then point accordingly. Still further, one fan may point towards one device, and another fan towards another device if two thresholds are reached, or a first threshold has been reached, without yet reaching an upper threshold. For example, at 140 degrees, one fan may change orientation and point to a CPU, while another is directed towards the GPU. At 180 degrees, every fan may point to the CPU, regardless of other thresholds. Time between changing orientations of a fan due to a newly directed threshold may be limited to the new threshold being met for at least a period of time, such as 5, 15 or 30 seconds and the delay may only be implemented if another trigger has already been breached. Any combination of the above embodiments is also within the scope and spirit of the claimed language.

Figure 10:
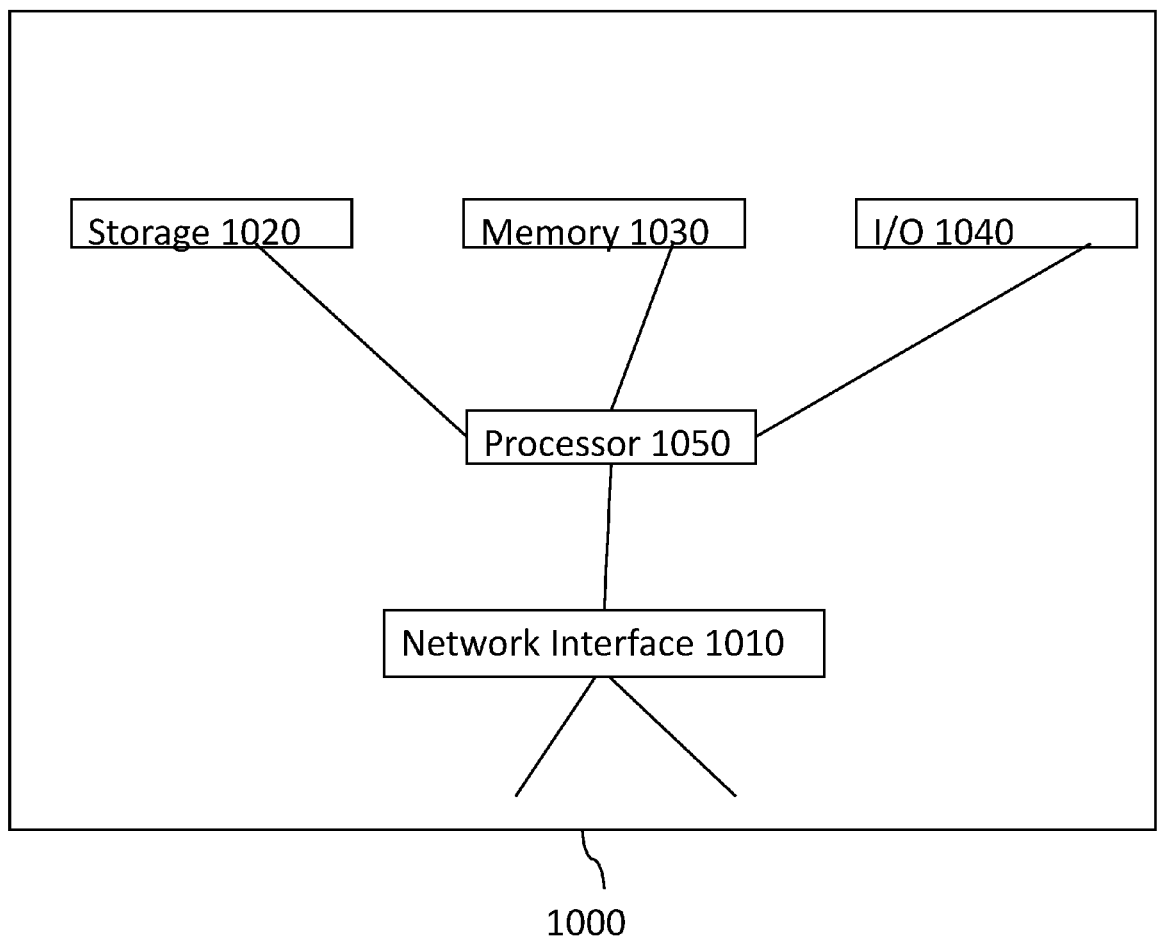
FIG. 10 shows a high-level block diagram of a device that may be used to carry out the disclosed technology.

FIG. 10 shows a high-level block diagram of a device that may be used to carry out the disclosed technology. Device 1000 comprises a processor 1050 that controls the overall operation of the computer by executing the device's program instructions which define such operation. The device's program instructions may be stored in a storage device 1020 (e.g., magnetic disk, database) and loaded into memory 1030 when execution of the console's program instructions is desired. Thus, the device's operation will be defined by the device's program instructions stored in memory 1030 and/or storage 1020, and the console will be controlled by processor 1050 executing the console's program instructions. A device 1000 also includes one or a plurality of input network interfaces for communicating with other devices via a network (e.g., the internet). The device 1000 further includes an electrical input interface for receiving power and data from a power or RFID source. A device 1000 also includes one or more output network interfaces 1010 for communicating with other devices. Device 1000 also includes input/output 1040, representing devices which allow for user interaction with a computer (e.g., display, keyboard, mouse, speakers, buttons, etc.). One skilled in the art will recognize that an implementation of an actual device will contain other components as well, and that FIG. 10 is a high level representation of some of the components of such a device for illustrative purposes. It should also be understood by one skilled in the art that the method and devices depicted in FIGS. 1 through 9 may be implemented on a device such as is shown in FIG. 10.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A method of directing air flow in a computer case based on heat generation, comprising:
    determining when a heat-related attribute of a first device within said computer rises above a pre-defined starting threshold;
    rotating at least one fan towards said first device;
    determining if a heat-related attribute of a second device within said computer rises above a pre-defined starting threshold;
    rotating said at least one fan towards said second device if said heat-related attribute of said second device takes priority over said attribute of said first device; and
    returning said at least one fan to an original position upon all heat-related attributes being below a finishing threshold.

2. The method of claim 1, wherein said finishing threshold is lower than both said pre-defined starting threshold of said first and said second device.

3. The method of claim 1, wherein said finishing threshold is equal to both said starting threshold of said first and said second device.

4. The method of claim 1, wherein said heat-related attribute of said second device only takes precedence over said heat-related attribute of said first device if said second device is a central processing unit.

5. The method of claim 1, wherein said at least one fan is rotated towards said second device only after said heat-related attribute of said first device falls below said finishing threshold.

6. The method of claim 1, wherein said at least one fan is at least two fans and at least one fan of said two fans sucks air away from said first device or said second device.

7. The method of claim 1, wherein said heat-related attribute of said first device and said second device is usage of said first device or said second device, respectively, said usage known to generate above-average amounts of heat.

8. The method of claim 7, wherein said usage is usage of a three-dimensional rendering engine.

9. The method of claim 7, wherein said usage is a measure of processor usage over a period of time.

10. The method of claim 7, wherein said heat-related attribute of said first device and said second device is a temperature of said first device or said second device, respectively.

* * * * *